UNITED STATES PATENT OFFICE.

WILLIAM E. BRINE, OF ST. MARGARET'S BAY, NOVA SCOTIA, CANADA.

LINIMENT.

SPECIFICATION forming part of Letters Patent No. 396,804, dated January 29, 1889.

Application filed November 30, 1888. Serial No. 292,286. (No specimens.) Patented in Canada June 28, 1887, No. 27,076.

*To all whom it may concern:*

Be it known that I, WILLIAM EDWARD BRINE, a citizen of Canada, residing at St. Margaret's Bay, in the county of Halifax, Province of Nova Scotia, Canada, have invented a new and useful composition of matter to be used as a preventive against and a relief for the bites of mosquitoes, black flies, and other insects, (for which I have obtained a patent in the Dominion of Canada, No. 27,076, dated June 28, 1887,) of which the following is a specification.

My composition consists of the following ingredients, combined in the proportions as hereinafter stated, viz: castor-oil, one-third part; kerosene-oil, one-third part, and equal proportions of glycerine and essence of peppermint one-third part. These ingredients are to be thoroughly mixed together by agitation or otherwise. I have usually mixed together the castor-oil and kerosene-oil, then the glycerine and oil of peppermint, and added the latter mixture to the former; but they may be otherwise combined or mixed together without changing the character or efficacy of the composition. By applying the above-named composition to the face, hands, and parts of the body that may be exposed to the bite of insects it will be found to effectually prevent the insects from biting such parts, and to speedily relieve bites already received.

What I claim, and desire to secure by Letters Patent, is—

The herein-described composition of matter to be used as a preventive against and for the relief of the bites of mosquitoes, black flies, and other insects, consisting of castor-oil, kerosene-oil, glycerine, and essence of peppermint, substantially in the proportions specified.

W. E. BRINE.

Witnesses:
CHAS. E. HAMILTON,
HARRY F. PHELAN.